United States Patent
Holecek

[15] 3,641,581
[45] Feb. 8, 1972

[54] METHOD AND ARRANGEMENT FOR REGISTERING AND RECORDING OF DEFORMATIONS OF MATERIALS

[72] Inventor: Milan Holecek, Prague Czechoslovakia

[73] Assignee: Projektovy ustav dopravnich a inzenyrskych staveb, Prague Czechoslovakia

[22] Filed: June 17, 1969

[21] Appl. No.: 834,116

[30] Foreign Application Priority Data

June 18, 1968 Czechoslovakia...............PV 4459/68

[52] U.S. Cl....................................346/1, 73/94, 346/138, 346/33
[51] Int. Cl.........................................G01d 9/10, G01n 3/08
[58] Field of Search................73/84, 94; 346/114, 115, 118, 346/33, 138, 127, 1

[56] References Cited

UNITED STATES PATENTS

| | | | |
|---|---|---|---|
| 2,554,981 | 5/1951 | Goff | 346/138 X |
| 2,810,289 | 10/1957 | Button | 73/94 |
| 3,063,051 | 11/1962 | Palm | 346/33 |
| 3,245,253 | 4/1966 | Gruber | 73/90 UX |

*Primary Examiner*—Joseph W. Hartary
*Attorney*—Richard Low

[57] ABSTRACT

Deformations of material such as soil and rock due to prolonged application of pressure are automatically registered and recorded on record carriers moved through an equal step at given time interval which time intervals are increased automatically in the course of application of pressure.

6 Claims, 5 Drawing Figures

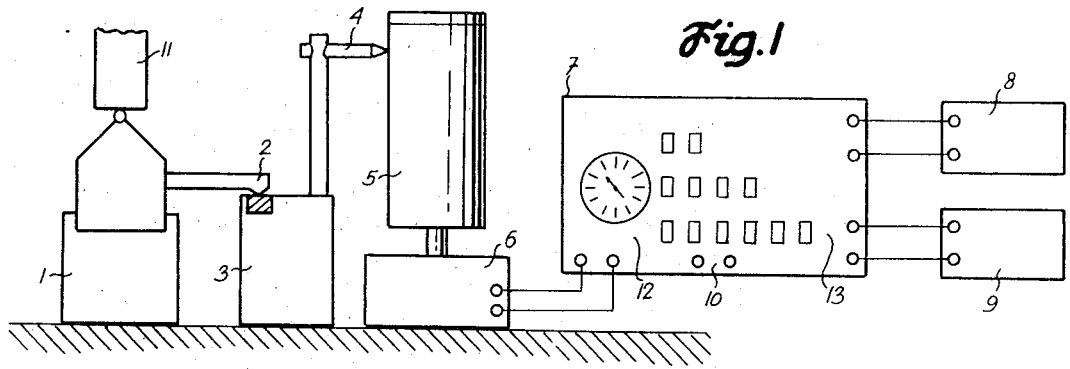
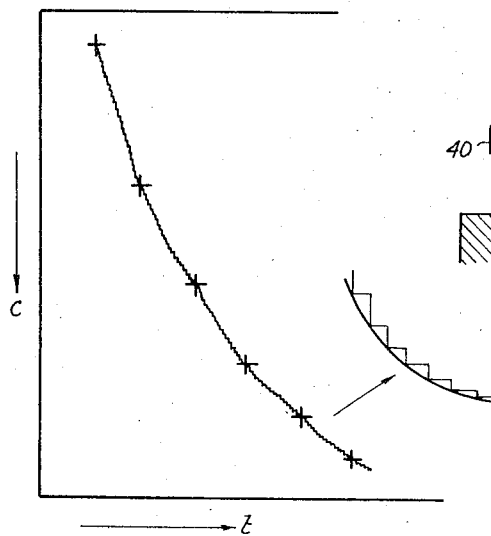
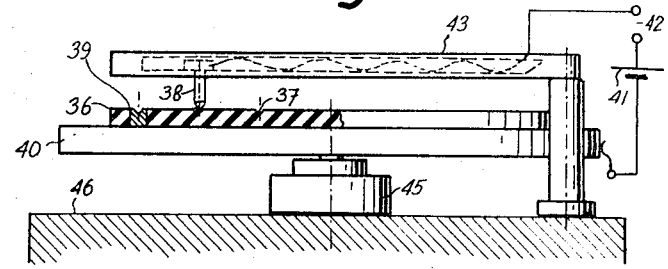
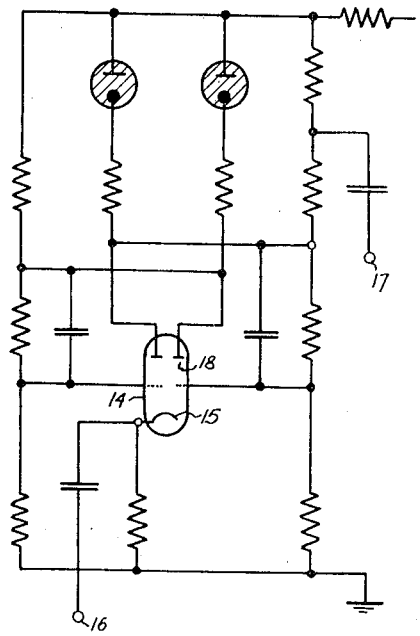
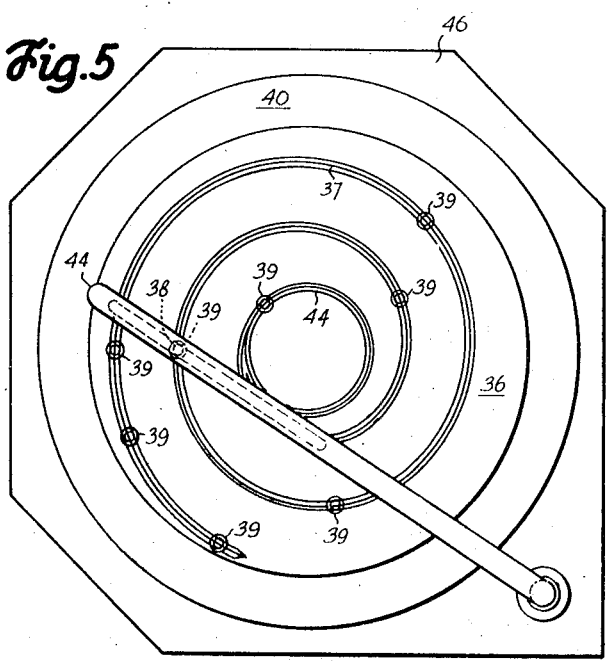
INVENTOR
Milan Holeček

METHOD AND ARRANGEMENT FOR REGISTERING AND RECORDING OF DEFORMATIONS OF MATERIALS

BACKGROUND OF THE INVENTION

This invention relates to a method and to an arrangement for automatically registering and recording deformations of material such as soil and rock due to prolonged pressure in order to obtain tests about the behavior of the material at different conditions. Such tests are particularly required when geological engineering surveys are performed or as part of preparatory work prior to erecting buildings. Such tests comprise for instance the test of consolidation of the soil, a triaxial test, slip test and similar determinations.

Measuring apparatus such as an oedometer have been used by which readings are visually registered, manually recorded on record carriers and plotted in graphs; the graphs generally plotting the abscissa as the time and the ordinate values indicating the compression of the material. Other more complicated instruments are provided with a moving record carrier, for instance paper. The values showing the consolidation of the soil are mechanically or pneumatically amplified and the amplified result recorded on the carrier which is uniformly rotated. Due to the uniform movement of the record carrier large values are recorded at the start of the test, followed by smaller values and in consequence thereof a relatively large speed of movement of the record carrier has to be chosen. In the final stages such a record however renders no clear result of the final consolidation of the sample of soil or rock. Known methods require therefore a considerable time, personal care and manual work, and errors cannot be eliminated particularly in the course of replotting the graphs.

SUMMARY OF THE INVENTION

It is an object of this invention to eliminate said drawbacks of the prior devices by indicating the obtained deformation continuously by means of a measuring apparatus and registering the indicated values linearly on a record carrier while moving said record carrier for an equal step at given time interval. The time intervals are automatically increased in the course of application of pressure to the sample. The record carrier is driven by an incremental drive controlled by a pulse generator, which itself is controlled by a time programming device, as for instance by a suitably adapted binomial reductor.

The step-by-step movement of the record carrier at suitably chosen time intervals brings about a compact and clear record. The extent of the recorded deformation is in relation to time, such that the curves are plotted on record carriers of reasonable size. No replotting of the obtained results is required, and the whole operation proceeds automatically without the presence of any attendant. The whole process can be also combined with automatically increasing pressure acting on the tested soil or rock at predetermined moments.

DESCRIPTION OF DRAWINGS

An embodiment is shown in the accompanying drawings where

FIG. 1 is a schematic outline of the general arrangement of the present invention FIG. 2 is a sample of records on a record carrier FIG. 3 is an electric wiring diagram of a flip-flop element of the control circuit FIG. 4 is an elevation and FIG. 5 a top view of a mechanical device for generating control pulses.

DESCRIPTION OF PREFERRED EMBODIMENT

With reference to FIG. 1 the arrangement comprises an oedometer 1 as the measuring apparatus with a pressure generating device 11, an amplifier 3 which may be of the pneumatic or other type, a recording drum 5, a driving unit 6, a generator pulse 7 operating according to a stipulated program, a control panel 8 and an electric supply source 9 which can be a battery or the usual electric mains. The sample of soil or rock is placed in the oedometer 1. The input of the pneumatic amplifier 3 of deformations is in contact with an arm 2 of the oedometer 1, amplifies and increases the signal representative of any deformation such as compression. The recording pen 4 of the amplifier 3 resiliently contacts the record carrier which is fixed on the recording drum 5 and moves linearly in a vertical direction in response to the measured deformation. The incremental driving unit 6, provided for instance, by an IBM time counter, is connected in the electrical circuit of the pulse generator 7. The circuit comprises a timing programmer, controlled from the control panel 8. The electric supply source 9 includes an electric accumulator supplied from the network by means of a rectifier unit not shown in the drawing. The pulse generator 7 comprises a source 12 of accurately timed electric pulses connected to the input of a binomial reductor 13 comprising a number of transistorized flip-flop circuits. A form of the reductor 13 with electron valves is shown in FIG. 3. One of the reductor valves is normally opened while the other is normally closed. It also comprises a twin triode 14 with auxiliary circuits. A positive impulse from the pulse source 12 flows by way of input 16 to the common cathode 15 of the twin triode 14 causing the circuit to reverse. The open valve is then closed, while the closed valve is then opened. The impulse from the left anode 18 passes through a derivating auxiliary circuit by way of the output terminal 17 to the cathode of the follower element of the reductor 13 which is of similar design. As the flip-flop circuit is reversed only by an impulse of a certain polarity, the next reductor element is reversed only by one-half of the pulses, supplied to the input of the first reductor element. The power output of this chain of reductor elements is connected to the incremental driving unit 6. It is obvious that electronic valves can be replaced after some adjustments of the circuit by suitable transistors.

A mechanical generator 7 of pulses can be also designed as indicated in FIGS. 4 and 5. A programming spiral groove 37 is engraved in a regularly rotating timing disc 36 of insulating material resting on a metal supporting disc 40. A collector arm 43 of insulating material is pivotally supported on a stable baseplate 46. The arm 43 is provided at its free extremity with a contact tip 38 engaging into the groove 37. A number of conducting contact places 39 are provided in the groove 37 which extend in contact with the supporting disc 40. The contact tip 38 is electrically connected with one of the terminals 42 while the disc 40 is connected to the second terminal, which itself is grounded through the frame 46 over the source 41 of electric current.

A rotating movement is imparted to the supporting disc 40 by means of a clockwork 45 mechanism so that, the contact tip 38 comes sequentially into engagement with the conducting contact places 39 in the spiral groove 37. An impulse is thus generated which can be used for the movement of the driving unit 6. The instantaneous position of the contact tip 38 simultaneously indicates how far the measuring operation has proceeded.

The described arrangement operates as follows:

A sample of soil or rock is placed in the oedometer 1 and pressure is applied to this sample by the pressure generating device 11. The subsequent load settlement of the sample is indicated directly by the arm 2 acting on the amplifier 3 and the amplified values of deformations are transmitted to the recording pen 4. The recording drum 5 bearing the record carrier is turned in equal increments at time intervals determined by the timing and driving devices 6, 7, 8. In consequence thereof at predetermined intervals the recording pen 4 registers on the record carrier vertical lines when the recording drum 5 is at standstill and horizontal lines when the drum is turned. An example of such a record is shown in FIG. 2. Time $t$ is plotted on the abscissa, while the degree of consolidation $c$ is shown on the ordinate. At the right part of FIG. 2 is shown an enlarged part of the recorded line showing more clearly how this line is drawn. The line connecting the corners of this stepped line pointing to the cross point of coordinates represents the actual course of consolidation, where time $t$ is plotted directly in logarithmic scale owing to the inverse relation between power and logarithmic function. In the course of performing the test, the consolidation of soil reaches for a certain pressure such a degree, that further consolidation is negligible. An increased pressure can then be applied if more informations about the behavior of the material is required. The binomial reductor 13 causes transmission of pulses for the control of the driving unit 6 according to a predetermined sequence, for instance at a geometric progression subsequent to the second, fourth, eighth, 16th and so forth uniformly timed impulse of the source 12. This sequence can be of course chosen arbitrarily. The same may be obtained by use of the mechanical pulse source shown in FIGS. 4 and 5.

It is obvious from the foregoing, that by means of this method the whole test can proceed quite automatically without interference of any attendant and can be easily prolonged by use of suitable arranged reductors or pulse sources to days or months in order to obtain safe results about the behavior of the tested material.

I claim:

1. A method of recording deformations of samples such as soil and rock due to the prolonged application of a load thereon in dependence of time, comprising the steps of continuously measuring the deformation of said sample, graphically indicating said measurement linearly on a record carrier, moving said record carrier at predetermined intervals in a direction perpendicular to the linear direction of said graphic indication and automatically varying the predetermined time intervals in the course of recording, whereby said graphic indication is shifted stepwise normal to the linear record of deformation on the passage of a selected period of time.

2. The method according to claim 1 wherein the variations of said time interval are sequentially determined in accordance with a geometric progression.

3. The method according to claim 2 including the step of moving said carrier at a uniform transport speed for each time interval.

4. Apparatus for recording the deformations of samples such as soil and rock due to the prolonged application of a pressure load thereon in dependence of time, comprising means for measuring the deformation of said material, linearly moveable recording means directly responsive to said measurement for graphically indicating said deformations, record carrier means movably associated with said recording means for receiving said graphic indications and means for intermittently moving said record carrier at predetermined intervals in a direction perpendicularly to said linearly moveable recording means, including means for automatically varying the time interval in accordance with a geometric progression to cause said recording means to shift stepwise on passage of a selected time period.

5. The apparatus according to claim 4 wherein said means for intermittently moving includes a carrier drive means, and wherein said means for automatically varying includes a source of power, a pulse generator interposed between said carrier drive means and said source, and a timing mechanism for controlling said pulse generator, said timing mechanism selecting pulses in accordance with a geometric progression for transmission to said carrier driving means.

6. The apparatus according to claim 4 wherein said means for intermittently moving includes a carrier drive means, and wherein said means for automatically varying includes a source of power, a timing mechanism comprising a rotating disc having a spiral groove therein, and a series of contact points arranged sequentially in said groove and a contact arm adapted to ride in said groove and engage said contact points on rotation of said disc, to thereby provide an interval contact between said carrier drive means and said power source.

* * * * *